US006195751B1

(12) United States Patent
Caronni et al.

(10) Patent No.: US 6,195,751 B1
(45) Date of Patent: Feb. 27, 2001

(54) EFFICIENT, SECURE MULTICASTING WITH MINIMAL KNOWLEDGE

(75) Inventors: Germano Caronni, Sunnyvale, CA (US); Marcel Waldvogel, Winterthur (CH)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/066,020

(22) Filed: Apr. 24, 1998

Related U.S. Application Data

(63) Continuation-in-part of application No. 09/009,495, filed on Jan. 20, 1998, now Pat. No. 6,049,878.

(51) Int. Cl.[7] .................................................. H04K 1/00
(52) U.S. Cl. ............................................ 713/163; 713/162
(58) Field of Search ................................... 713/162, 163; 380/270, 278, 283, 279, 277, 239

(56) References Cited

U.S. PATENT DOCUMENTS

| | | | |
|---|---|---|---|
| 5,029,208 | 7/1991 | Tanaka | 380/21 |
| 5,311,593 | * 5/1994 | Carmi | 380/23 |
| 5,748,736 | 5/1998 | Mittra | 380/21 |
| 6,026,167 | * 2/2000 | Aziz | 380/28 |

OTHER PUBLICATIONS

H. Harney and C. Muckenhirn, "Group Key Management Protocol (GKMP) Specification" http://info.internet.isi.edu, Jul. 1997.*

Ashar Aziz and Martin Patterson, "Design and Implementation of SKIP", Sun Microsystems Inc, Jun. 1995.*

Tony Ballardie and Joe Crowcroft, "Multicast–Specific Security Threats and Counter–Measures", IEEE, Jan. 1995.*

Li Gong and Nachum Shacham, "Multicast security and its extension to a mobile environment", Wireless Metworks 1 (1995) 281–295, Jan. 1995.*

Suvo Mittra, "Iolus: A Framework for Scalable Secure Multicasting", Association of Computer Machinery, Jan. 1995.*

A. Ballardie, "Scalable Multicast Key Distribution", http://info.internet.isi.edu/in–notes/rfc/files rfc 1949.txt, May 1996.*

H. Harney and C. Muckenhirn, "Group Key Management Protocol (GKMP) Architecture", http://info.internet.isi.edu/in–notes/rfc/files/rfc2094.txt, Jul. 1997.*

Ingemar Ingermarsson, Donald T. Tang, and C.K. Wong, "A Conference Key Distribution System," IEEE Transactions on Information Theory, Sep. 1982.

Guang–Huei Chiou, Wen–Tsuen Chen, "Secure Broadcasting Using the Secure Lock," IEEE Transactions on Information Software Engineering, Aug. 1989.

(List continued on next page.)

Primary Examiner—Thomas R. Peeso
Assistant Examiner—Todd Jack
(74) Attorney, Agent, or Firm—Holland & Hart LLP

(57) ABSTRACT

A system for secure multicast including a plurality of participants that can send and receive multicast messages. A traffic distribution component is coupled to the participating entities, where the traffic distribution component supports multiple receiver communication. A participant key management component operates within each participant entity where the participant key management component uses a first key that is shared with all of the other participants, and a second key that is shared with a subgroup of participants. A group key management component is implemented using a flat data structure having a size that is logarithmically proportional to the number of participants.

22 Claims, 4 Drawing Sheets

OTHER PUBLICATIONS

Mike Burmester, Yvo G. Desmedt, "Efficient and Secure Conference–Key Distribution," Security Protocols Workshop 1996.

Li Gong, Nacham Shacham, "Multicast Security and its Extension to a Mobile Environment," ACM–Baltzer Journal of Wireless Networks, Oct. 1995.

Suvo Mittra, "Iolus: A Framework for Scalable Secure Multicasting," Proceedings of the ACM SIGCOMM '97, Sep. 14–18, 1997.

T. Ballardie, J. Crowcroft, "Multicast–Specific Security Threats and Counter–Measures," Symposium on Network and Distributed System Security, 1995.

Ashar Aziz, Martin Patterson, "Design and Implementation of SKIP", White Paper ICG–95–0004, Jun. 28, 1995.

A. Ballardie, "Scalable Multicast Key Distribution," rfc 1949.txt at info.internet.isi.edu, May 1996.

H. Harney, C. Muckenhirn, "Group Key Management Protocol (GKMP) Specification," rfc2093.txt at info.internet.isi.edu, Jul. 1997.

H. Harney, C. Muckenhirn, "Group Key Management Protocol (GKMP) Architecture," rfc2094.txt at info.internet.isi.edu, Jul. 1997.

* cited by examiner

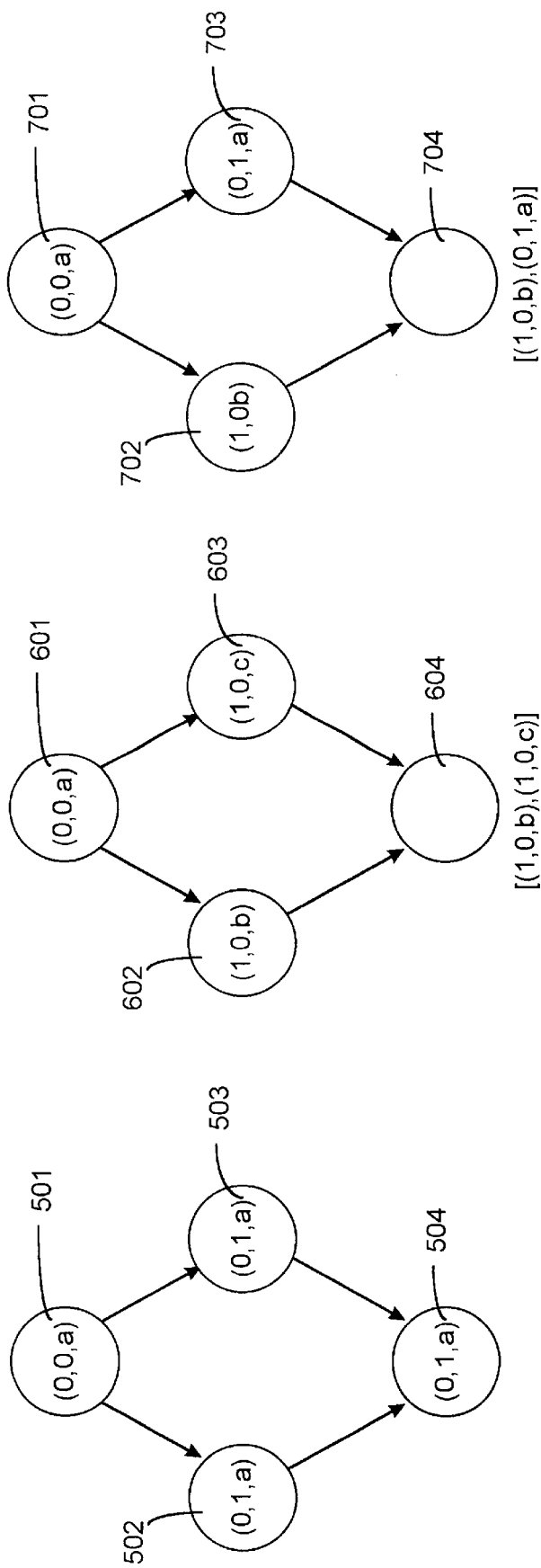

EFFICIENT, SECURE MULTICASTING WITH MINIMAL KNOWLEDGE

RELATED APPLICATIONS

This is a continuation-in-part of U.S. patent application Ser. No. 09/009,475 filed Jan. 20, 1998 titled "Efficient, Secure Multicasting with Global Knowledge" invented by the inventors of this application and assigned to the assignee of the present invention. The entire specification of U.S. patent application Ser. No. 09/009,475 (now U.S. Pat. No. 6,049,878) is incorporated herein by reference.

BACKGROUND OF THE INVENTION

1. Field of the Invention

The present invention relates, in general, to group data communications, and, more particularly, to secure multi-destination communications over an unsecured communication channel.

2. Relevant Background

Distributed applications such as multimedia conferencing, computer-supported collaborative work, distributed computing, and remote consultation and diagnosis systems for medical applications depend on efficient information exchange among multiple participants. Multi-destination communication and data exchange over a public network are essential for such applications. This type of communication is referred to generally herein as "multicast". Some applications, generally referred to herein as "broadcasting applications", are characterized by a small number of sending parties and a large dynamically changing group of receiving parties. Other applications referred to herein as "conferencing applications" involve a large number of sending and receiving participants.

When a group of people want to communicate over a public network such as the Internet in a conference, every message sent out by one of the participants is received by all other participants. The mechanism used to do this communication is called multicast. Any Internet subscriber or user with access to a public network may subscribe to a multicast communication group and will subsequently receive all messages sent to this group. Additionally, any Internet subscriber will be able to send messages to the whole group.

Multicast is rapidly becoming an important mode of communication as well as an effective platform for building group-oriented services. However, to be used for secure or trusted communication, existing multicast techniques must be supplemented by tools for protecting (i.e. encrypting and authenticating) traffic, controlling participation, and restricting access from unauthorized users.

A need for secure electronic information exchange over insecure public networks is increasingly apparent. As compared to conventional unicast, (i.e., point-to-point), multicast is more susceptible to attack. Multicast transmissions present substantially more opportunities for interception of the traffic due to the fact that the message is potentially distributed over a large portion of the network. When an attack occurs, a large number of multicast participants are affected. Further, since multicast addresses are often well known, it becomes easier for an attacker to target an attack. Moreover, multicast typically involves a large number of authorized users which can make it easier for a group of colluding members (or a single attacker posing as a group of legitimate users) to attempt attacks in parallel. While secure unicast communications are well understood, prior attempts at secure multicast communication have difficulty in scaling to large groups and handling groups with highly dynamic membership.

To help achieve secure electronic information exchange, any network security protocol should allow authorized participants to communicate securely over an insecure network under conditions where an attacker is assumed to be able to read, insert, modify, and delete raw communications. Typically, this protocol is achieved by creating a security association between the authorized participants through authentication and key exchange. The security association defines a set of keying material shared only by the authorized participants that can be used for a variety of security objectives such as authentication, confidentiality, and integrity verification.

In a multicast scenario, the security association between participants must be dynamic to support membership changes. A secure multicast communication group must ensure that participants are only allowed to participate during periods when they are authorized. A participant may be authorized to participate in the secure multicast at some periods of time and not authorized to participate during other periods. For example, in a pay-per-view program access a receiver is only authorized for the time periods for which they have paid. The security association and the group keying material it defines must be changed each time a participant joins or leaves the multicast group. This change is necessary to ensure that a joining participant is not able to understand data that was previously multicast and the leaving entity is not able to continue to understand data multicast after its authorization expires. The management and distribution of dynamic security associations and keying material is a fundamental difficulty in a secure multicast protocol.

Practical communication systems must provide reasonable efficiency over the network. By efficiency it is meant that the steps taken to ensure secure communication do not add an inordinate amount of overhead traffic that consumes bandwidth without transferring "payload" information (e.g., application-level data) between participants. For the foreseeable future all communication networks will have some bandwidth limitation which places a premium on efficient communication systems. Hence, it is desirable that the security procedures require minimal communication between participants to perform key management. In fact, in some scenarios such as television or radio broadcast there is only a one-way channel available in which case the need for minimal participant communication is paramount.

Efficiency also means that the steps taken to ensure secure communication do not place an unacceptable computational and data structure burden on the participants. Key management and encryption/decryption processes require participants to perform some additional computation to retrieve a secure communication. These processes also require the participants to implement data structures (i.e., tables, key storage areas, and the like) that may have considerable size. It often occurs that the number, size and/or complexity of these computations and data structures increase as the number of participants in the multicast communication group increases. In many cases, the complexity increases much faster than the number of participants making the security method unscalable because of these computational and data structure costs. Increasing complexity results in poorer performance and/or higher hardware and software costs for each participant entity.

To achieve efficient private communications over the network, all participants in the group need to share a secret information (i.e., key information). The manner of how this secret information is shared and maintained during the lifetime of the group is a focus of the present invention. Prior applications may continuously establish a unicast connections between a sender and all receivers to update security associations and exchange key information. Such continuously required unicast connections are not practical for large groups. For a key change many messages have to be generated or a message has to be processed by intermediate hops which is not efficient. Given a large group where participants may continuously leave and join and where the actual key has to be changed for each leave and join to achieve privacy, computing resources may be insufficient if extensive computation (e.g., such as associated with public key cryptography) is required.

An example of a key management system directed to unicast communications is the simple key management for Internet protocols (SunScreen™ SKIP, (SunScreen is a trademark of Sun Microsystems, Inc.). SKIP is a public key certificate-based key-management scheme which provides group key-management for Internet protocols. Prior multicast implementations of SKIP create a single multicast group and do not handle automatic key changes when participants join and leave the group. Designed to be application independent, SKIP can be plugged into the IP Security Protocol (IPSP) of IPV6. Using certified Diffie/Hellman keys, SKIP obviates the need for real session establishment by holding "soft" session state information that can be discarded and reproduced if necessary and obviates the need for prior communications between two participating ends in order to acquire and update traffic keys. This is one advantage of SKIP that is particularly suited to connectionless datagram protocols such as the Internet protocol. In the SKIP system, each participant has the capability to construct a shared secret (i.e., information needed for symmetric encryption) based only on knowledge of the other participants' public key combined with its own private key.

Multicast security protocols exhibit several types of scalability failures. A first type of failure occurs when the protocol allows the action of one member to affect the entire group. The second type of failure occurs when the protocol cannot deal with the group as a whole and instead, must consider the conflicting demands of each member on an individual basis. This requires point-to-point or unicast communication with each participant which reduces efficiency rapidly as more participants are added. A need exists for a multicast system that solves these and other scalability problems existing in the prior art.

A secure multicast framework called Iolus has been proposed that addresses some of these scalability issues by doing away with the idea of a single flat secure multicast group. Instead, Iolus substitutes the notion of a secure distribution tree. The secure distribution tree comprises a number of smaller secure multicast subgroups arranged in a hierarchy to create a single virtual secure multicast group. Because each sub-group is managed relatively independently, the Iolus framework is scalable. Each subgroup in the secure distribution tree has its own multicast group and can be created and managed using any suitable multicast routing protocol. One feature of the Iolus system is that there is no global group key or secret information that is shared among all of the subgroups. Hence, Iolus requires trust in third parties such as routers or other network components. Thus, when a member joins or leaves, it affects only its local subgroup. However, because there is no global secret information shared among all of the participants, re-keying is not optimal. Further, data sent in the framework must be re-keyed each time it gets into a different subgroup thereby increasing the computational overhead of the system.

Extensions to conventional Diffie-Hellman key exchange by have been proposed in which participants cooperatively compute a common session key. In a first example the participants are logically arranged in a ring and all participants in a multicast group join at the same time. The participants participate in n−1 key exchange rounds (where n is the number of group members). In a given round, every participant raises the previously-received intermediate key value to the power of its own exponent and forwards the result to the next participant. After n−1 rounds every participant holds the same key. This protocol involves high latency, is computationally burdensome for large groups, and is primarily suitable for static key distribution.

A more efficient protocol uses broadcast messages and executes in only three rounds. In the first round, each participant selects a random exponent $r_i$, computes a value $z_i = a^{r_i} \pmod{p}$, and broadcasts $z_i$. Secondly, each participant computes and broadcasts $X_i = (z_{i+1}/z_{i-1})^{r_i} \pmod{p}$. In the last round, each participant can compute the conference key $K_i = (z_{i-1})^{nr_i} \cdot X_i^{n-1} \cdot X_{i+1}^{n-2} \cdot \ldots \cdot X_{i-2}) \pmod{p}$. This key is identical for all participants. Although this protocol is roughly as fast as RSA and as secure as the Diffie-Hellman problem, it is difficult to deploy in a dynamic group. All members have to keep transient states for possible changes in the group membership, otherwise each join or leave has to be considered as a new group and all three rounds need to be redone. Also, the cooperation of all participants, involving n reliable broadcast messages, is required.

Yet another example provides a capability to distribute session keys in dynamic groups where a "group manager" entity has to perform O(n) exponentiations for each group change. While this protocol provides a way to distribute a session key in highly dynamic groups, the solution does not scale well to large groups and messages tend to become prohibitively large.

A need remains for a group data communications method and apparatus that provides secure multi-destination communications over an unsecured communication channel efficiently.

SUMMARY OF THE INVENTION

Briefly stated, the present invention involves a system for secure multicast including a plurality of participants that can send and/or receive multicast messages. A traffic distribution component is coupled to the participating entities, where the traffic distribution component supports receivers at multiple destinations. A group key management component uses a first key that is shared with all of the other participants, and a number of second keys each of which are shared with a set of subgroups where the first and second keys are stored and maintained in a group key database. The group key database is implemented in a non-hierarchical, flat fashion.

In a first implementation, the group key management component is implemented in a distributed fashion among a plurality of the participants such that the group key database is implemented in a distributed data structure. In a second implementation, the group key management component is centralized such that the group key management component has global knowledge of shared key information without knowledge of which participants share that key information.

BRIEF DESCRIPTION OF THE DRAWINGS

FIG. 5–FIG. 7 show in block diagram form a key merging feature in accordance with the present invention; and FIG. 8 illustrates an exemplary data packet used for communicating information in accordance with the present invention.

DETAILED DESCRIPTION OF THE PREFERRED EMBODIMENTS

Figure 1A:
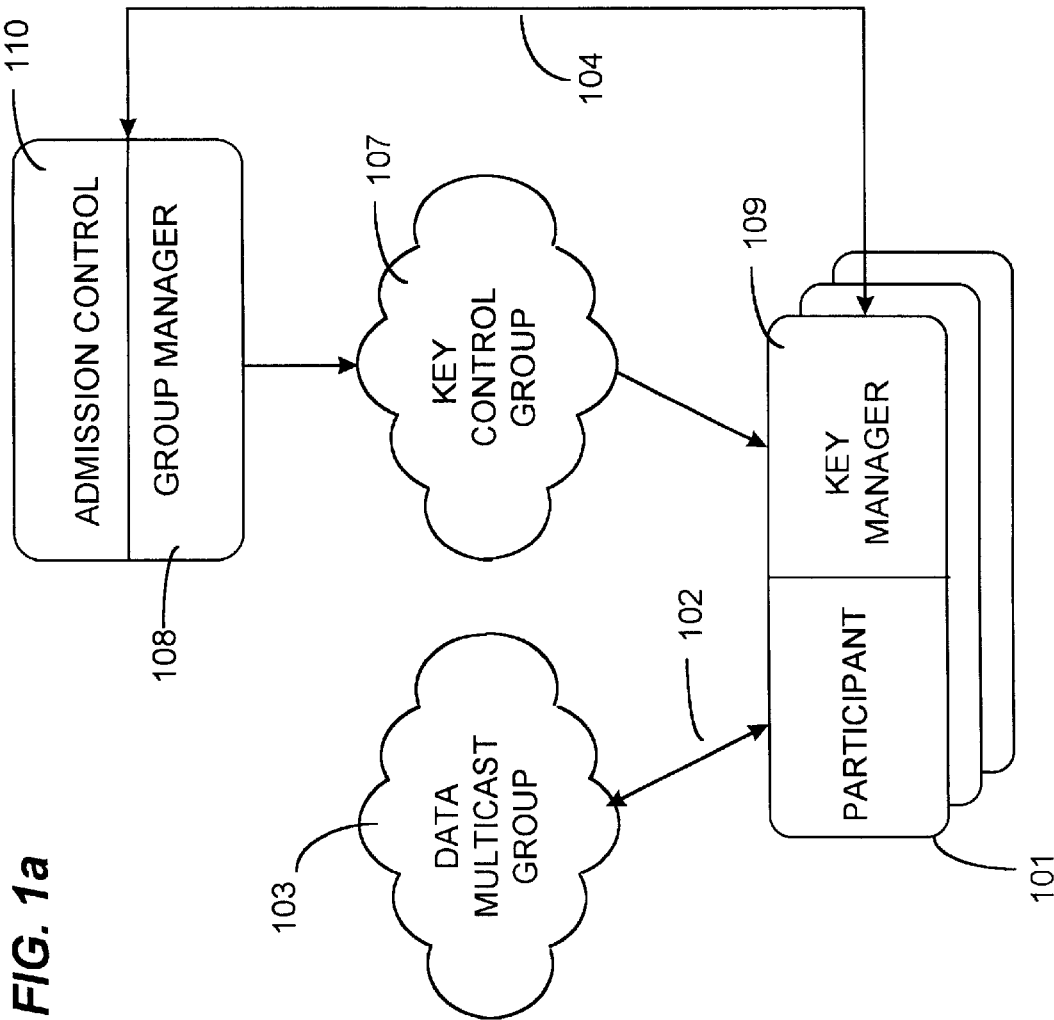
FIG. 1a and FIG. 1b illustrates in block diagram form exemplary embodiments of a secure multicast mechanism in accordance with the present invention.

Proposals for multicast security that have been published to date are complex, often require trust in network components or are inefficient. The present invention involves a number of approaches for achieving scaleable security in, for example, Internet protocol (IP) multicast as well as providing group-wide privacy and authentication. The present invention is usefully employed to efficiently secure multiparty applications where members of highly dynamic groups of arbitrary size may participate.

The present invention is described in terms of a secure multicast system and protocol but is more generally viewed as a group communications security protocol. The system and method in accordance with the present invention provide several useful features including privacy of widely transmitted messages, the ability to use untrusted third party network components, and full exploitation of multicast features. In accordance with the present invention, key management is provided with minimal computation and reduced storage requirements among the participants in a multicast communication group. The present invention logically organizes participants in a multicast communication group into a plurality of smaller virtual subgroups defined by the keying material they share with other participants. The present invention does not require the explicit assignment of participant identifications which simplifies synchronization (i.e., ensuring that each sending entity uses a consistent group-wide reference for each participant) in an environment having multiple sending participants. Additionally, a global and implicit way to define participant IDs allows any group member to initiate a leave operation without concern as to what ID other members know the leaving party by. Also, the system in accordance with the present invention prevents participants from reading future or past traffic that is outside of the authorized scope.

A conferencing or group collaboration scenario is characterized by a large, dynamically changing group of participant entities where each participant may be both a sender and a receiver. Related U.S. patent application Ser. No. 09/009,475 is directed at solutions particularly useful in a broadcast scenario where only a few of the participants are senders and each participant held global knowledge in the form of keying information. In the related application each participant has knowledge of group membership, and so each participant includes storage space for holding keying information shared with group members. For example, in a situation with a number N participants and each participant is identified by a W-bit long network address, the parent application uses a hierarchical data structure storing a total of $(2 \cdot N)-1$ entries in the group key manager. In contrast, the present invention uses a flat data structure that reduces storage requirements to only $W+1$ entries stored in each participant in a first embodiment and $2 \cdot W+1$ entries in a centralized database in a second embodiment. By using a flat key data structure, the data structure size is logarithmically proportional to the number of participants as compared to hierarchical key data structures that have a size linearly proportional to the number of participants.

A first implementation of the present invention, referred to herein as a "distributed flat" implementation, is particularly useful in a conferencing or group collaboration scenario. In this first implementation the flat data structure is distributed across multiple participants. This implementation is immune to setup implosion because admission control responsibilities are distributed throughout the multicast group. Setup implosion occurs, for example, when a centralized access control entity must manage join and leave information from each of the participants. As the number of participants increases, the likelihood of receiving more messages than the centralized access control entity can handle (i.e., implosion) increases. Access control and key management in accordance with the present invention are performed by the participants independently.

Additionally, the distributed system is more resilient against failures. The loss of some members or network links does not automatically result in the failure of the whole group. In hierarchical approaches, loosing the entity implementing the group key manager function is fatal. In the distributed flat implementation of the present invention changeover or handoff of control of information held by a missing participant is done automatically. In a centralized flat implementation of the present invention, described below, a new participant can be elected to implement the group key manager function at the cost of some added complexity.

A second implementation, referred to herein as "centralized flat" is particularly useful in the broadcast scenario where data traffic is substantially unidirectional. The second implementation uses a centralized entity to implement the flat data structure. The centralize flat implementation reduces the data structure size to $2W+1$ entries held in a centralized entity and reduces or eliminates any need for participants to communicate key control information with each other. While the centralized approach results in a central point of failure and is not immune to setup implosion, it provides many of the advantages and functionality of the first implementation described above.

Although each implementation of the present invention is described in terms of a scenario in which it has greatest utility, it is to be expressly understood that either implementation can be usefully, although perhaps not optimally, adapted for use in either broadcast or conferencing scenarios with appropriate modifications. Also, although the implementations are described in terms of a W-bit long network address for each participant, it is contemplated that each participant can be identified with a W-symbol wide ID where each symbol comprises multiple bits. This implementation is preferable in many applications because it allows each symbol to take on multiple (in contrast with only two) values.

Figure 1B:
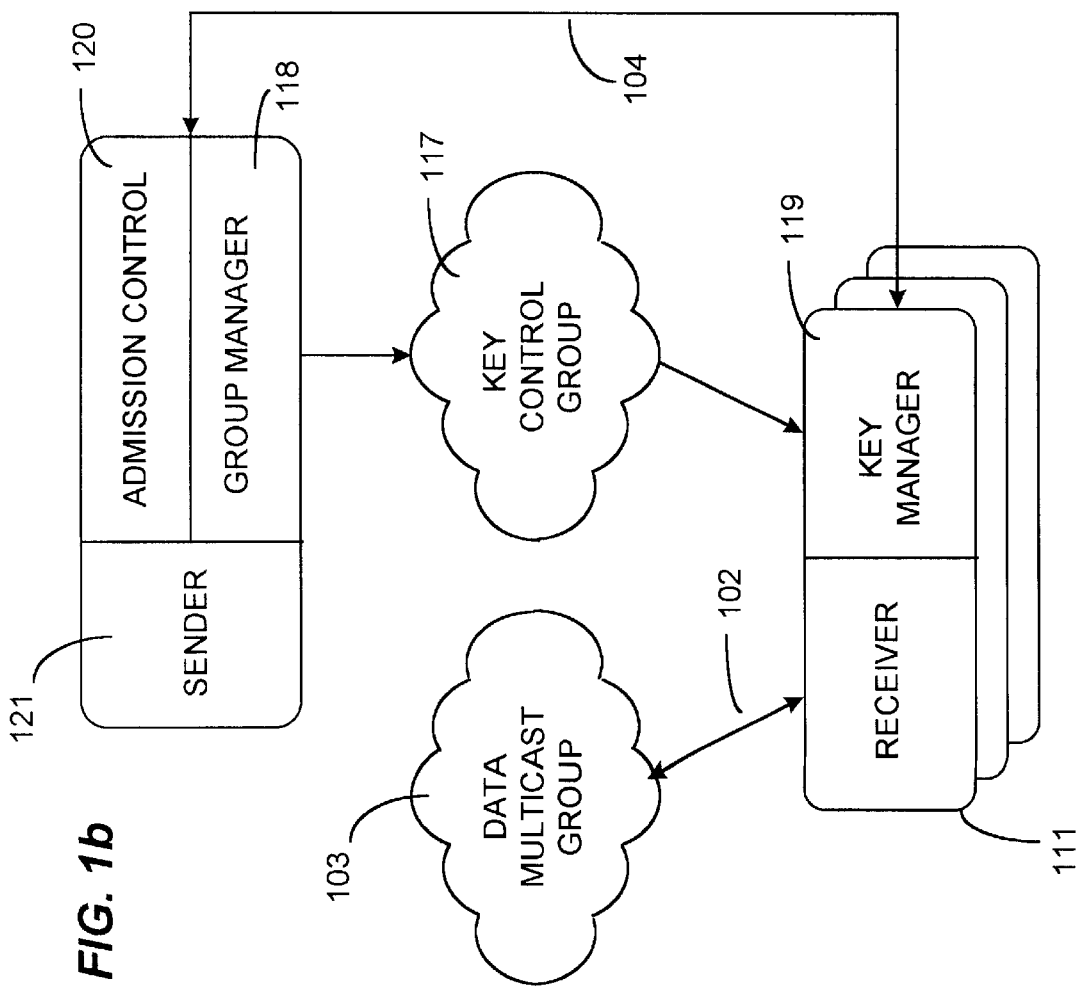

The secure multicast architecture in accordance with the present invention is usefully described as a plurality of interacting components as shown in FIG. 1a and FIG. 1b. The components in FIG. 1a illustrates the distributed flat implementation in a group conferencing scenario whereas FIG. 1b illustrates the centralize flat implementation. Like numbered components in FIG. 1a and FIG. 1b serve substantially equivalent purposes and provide substantially equivalent functionality.

FIG. 1a illustrates a scenario in which each participant 101 may be a sender and/or a receiver by communicating data packets over multicast data connection 102 to data multicast group 103. In a group conferencing scenario, senders and receivers may not be distinguishable. Any participant 101 is free to send data over multicast data connection 102 where the data is encrypted using secret information shared by all the participants 101. In a group collaboration environment, for example, each participant 101 holds both sender and receiver roles at the same time.

In the group collaboration scenario illustrated in FIG. 1 an admission control component 110, is contacted via a one shot control connection 104 by each new participant 101 to join the group. Control connection 104 can be implemented, for example using a secure unicast connection or an out-of-band channel when there is not a return channel.

In the implementation shown in FIG. 1a, admission control component 110 is replicated several times in several participants 101. In practice it is likely that each participant 101 includes an admission control component 110, although in a particular instance some admission control components 110 will be active and others will be dormant when not needed.

Group key management component 108 accepts participants 101 that are admitted by a n admission control component 110 and receive their keying material. Optionally, any admission control component 110 may also initiate forced leave of any participant 101 unilaterally without being contacted.

Control connection 104 comprises, for example, a conventional unicast connection that is established and taken down as needed during admission control operations. This unicast connection only exists once for each participant 101 and can be dissolved after the participant 101 receives its set up information. In this manner the relatively significant overhead created by setting up a new participant 101 is only performed when necessary, greatly improving the efficiency of the system in accordance with the present invention. This unicast connection may also be handled using out-of-band methods.

The admission control component 110 communicates with the group key management component 108 and informs it of joins and leaves. Group management component 108 manages join and leave operations, and establishes and generates messages to have key manager components 109 perform necessary key changes (described hereinbelow).

Key control group 107 is a virtual subgroup of participants defined by shared keying information and linked by any multicast, broadcast, or anycast channel delivering packets from group management components 108 to key manager components 109 of at least the intended participants 101. Traffic in key control group 107 comprises packets containing new keying material which needs to be distributed to key management components 109. The keying information that defines key control group 107 is held in the flat data structure or key database in accordance with the present invention. In the implementation shown in FIG. 1a, the physical instance of this key database is distributed among a plurality of participants 101.

In the implementation shown in FIG. 1b, admission control component 120 is implemented in a centralized entity. Optionally, admission control 110 and group key manager 118 can be united in a single entity with a sending participant 121 to establish the single sender for a group. Alternatively, these components can be implemented in separate entities. In this implementation, only the centralized admission control component 120 can perform access control and communicates with group key management component 118 to informs it of joins and leaves. Group management component 118 manages join and leave operations, and establishes and generates messages to have key manager components 109 perform necessary key changes (described hereinbelow).

Key control group 117 is a virtual subgroup of participants (akin to key control group 107) defined by shared keying information and linked by any multicast, broadcast, or anycast channel delivering packets from group management components 118 to at least the intended receivers 111. The keying information that defines key control group 117 is held in the flat data structure or key database in accordance with the centralized flat implementation of the present invention. In the implementation shown in FIG. 1b, the physical instance of this key database is centralized in, for example, the sender or in components physically separate from but associated with sender 121. Traffic in key control group 117 comprises packets containing new keying material which needs to be distributed to key management components 119.

In FIG. 1a and FIG. 1b, transmissions over key control group 107 and 117 have to be received by every participant 101 (or receiver 111), which can be achieved by (1) implementing components of any reliable multicast mechanism or (2) performing retransmits on a regular basis with a limited history of key changes, resulting in a soft state approach. The latter approach is desirable for scenarios without a return channel and is especially useful if the loss rate is known (e.g. through bandwidth reservation) or through known good or reliable transmission channels. Periodic retransmissions enable a participant to catch up with key changes after being out of touch with key control group 107 for a specified period of time. Less reliable channels require a higher retransmission rate or a longer duration of retransmission to account for dropped information.

If for any reason a receiver 111 or receiving participant 101 should be unable to receive a packet in reasonable time, the fallback solution is for the participant 101 or receiver 111 to contact group manager 108 or 118 again. This can also be done using a secure unicast connection or an out-of-band channel akin to control connection 104 when there is not a return channel.

Figure 2:
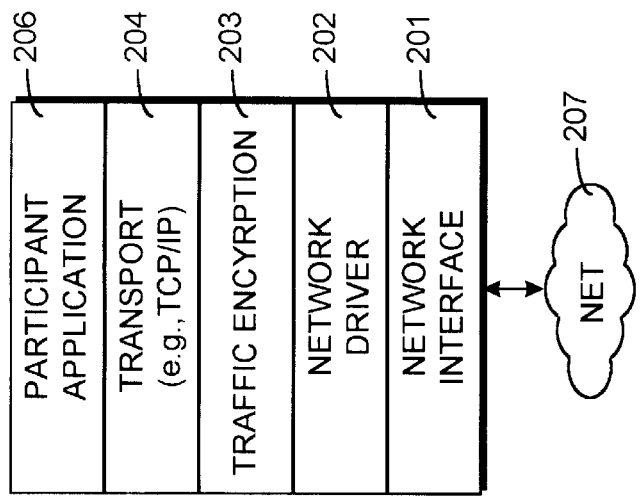
FIG. 2 shows in block diagram form exemplary component parts of a secure multicast system in accordance with the present invention.

FIG. 2 illustrates in block diagram form traffic distribution components within each participant 101 including network interface 201, network drivers 202, and a physical communication network 207. These components are conveniently implemented using available hardware and software solutions to meet the needs of a particular network environment.

The traffic encryption component 203 is the component that actually sends data. Traffic encryption component 203 holds a symmetric traffic encryption key (TEK) that is generated by the group key management component 108 and received and decoded by key manager component 109 shown in FIG. 1. The traffic encryption component 203 uses the TEK to encrypt data that is to be sent out and decrypt data that is received. In the example of FIG. 2, the traffic encryption component 203 receives network packets (e.g., IP packets) from the transport layer 204 (which in turn include data messages generated by participant multicast application 206), encrypts the entire network packet, and adds new header information (unencrypted) to direct the packet. Traffic encryption component 203 also receives network packets with encrypted payloads from network driver component 202, decrypts the packets using the stored TEK, and sends the decrypted packet to transport layer 204 for use by participant application 206. This encryption/ decryption can be performed using any available encryption algorithm or combination of algorithms including DES, RC4, other block stream ciphers, and the like. The encryption can also happen at any other convenient level.

An example network 207 includes a multicast backbone (MBONE) virtual transport mechanism operating on top of a conventional Internet protocol (IP) Internetwork. It is contemplated, however, that the present invention may be usefully employed on any physical network including wide area networks, local area networks, and the like.

In accordance with the distributed flat implementation of the present invention, admission control component 110 is implemented in each participant 101. In this manner, each participant 101 is able to perform access control operations. Also, each participant 101 includes a group manager component 108. More accurately, each participant 101 is capable of implementing a portion of group manager component 108 such that multiple participants working cooperatively implement the functionality of group manager 108. In this manner, each participant 101 is not burdened with the large resource requirements of a centralized group manager 108. However, because any participant may initiate join and leave operations, trust in all participants is important.

The main concerns with centralized approaches such as that shown in FIG. 1b is the danger of implosion and the existence of a single point of failure. Hence, the implementation shown in FIG. 1a offers an attractive distributed solution for the key management problem. In accordance with the present invention the key database of group key manager 108 is completely distributed, such that all participants 101 are created equal and no individual participant 101 has complete knowledge. Each participant 101 only holds keys matching its own ID, and the collaboration of multiple participants 101 is required to propagate changes to the whole group. There is no single entity dedicated to implementing group manager 108, instead, every participant 101 may (but does not always need to) perform admission control operations.

The distributed flat implementation is resilient to network or node failures because of its inherent self-healing capability. However, it is somewhat more vulnerable to inside attacks because key management is distributed. Hence, appropriate precautions should be taken to control the risk of such attacks. The present invention offers the high resistance to break-in attacks and thanks to its higher resilience to failures, it can be considered stronger against outside "denial-of-service" attacks than is the centralized flat solution shown in FIG. 1b.

The present invention is usefully understood in terms of five distinct stages or states in the operation of the components described herein before. The states include "group creation", "group join", "data transfer", "group leave" and "group destruction". These operational states are described in greater detail after describing the data structures of the major components in accordance with the present invention.

Each participant 101 or receiver 111 is identified with a unique ID. In either implementation there is no single dedicated entity having global knowledge of the participant IDs in use, each participant ID should be generated uniquely in a distributed way. In accordance with the present invention, the participant's network address (e.g., the concatenation of its IP address and port number) is used directly or in combination with a collision-free hash function to provide unique participant IDs. Alternatively, an asynchronous transfer mode (ATM) address or any type of network identification or information derived from the network identification may be used as the participant ID so long as the ID generation does not create collisions.

Figure 3:
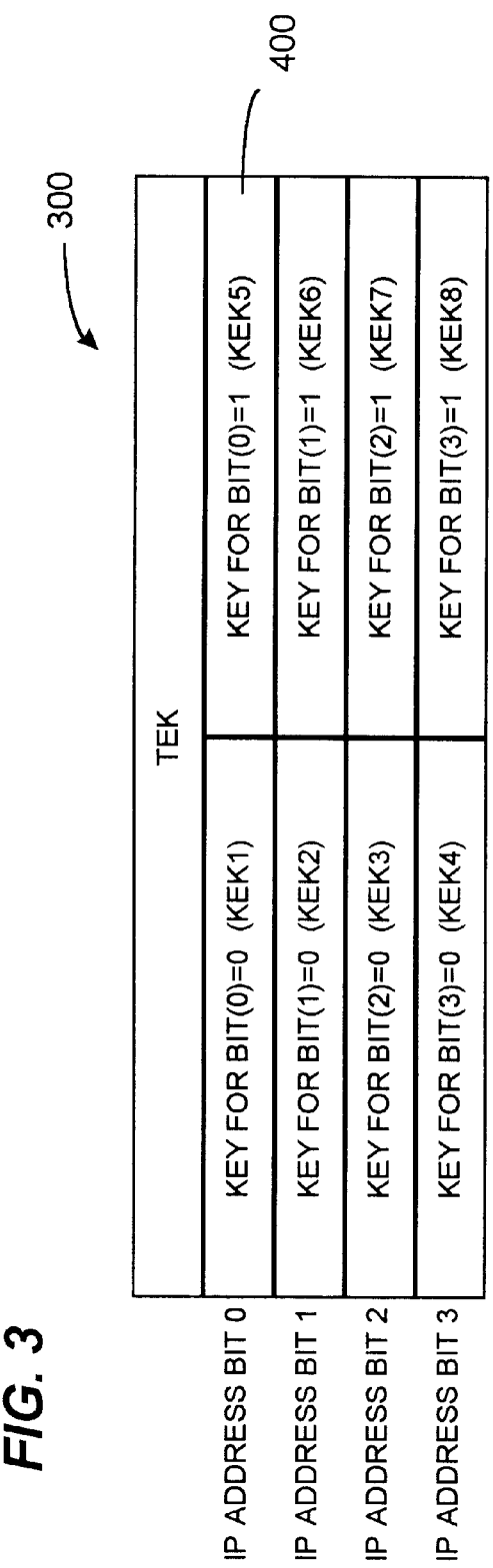
FIG. 3 shows a key database in accordance with the present invention.

FIG. 3 illustrates a simplified example of a group key manager database 300 useful to implement a key control group 107 or 117 shown in FIG. 1a and FIG. 1b. For ease of understanding, this database is illustrated as a unified entity, however, it should be understood that in accordance with the distributed flat implementation of the present invention database 300 is actually distributed among a plurality of participants 101. The example of FIG. 3 is simplified in that each W-symbol long participant ID is assumed to comprise only four binary symbols (i.e., W=4).

The database 300 includes a number equal to 2·W+1 entries 400 stored in, for example, a simple table data structure. One entry 401 holds the current TEK, and the other 2·W entries 400 hold "key encryption keys" (KEKs). When using single bits of the participant ID to designate the keys, there are two keys available corresponding to the two values (0 and 1) that the bit can take, totally 2·W KEKs and 1 TEK. On the left side of FIG. 3 are keys KEK1 through KEK4 corresponding to ID address bits equal to zero. On the right side of FIG. 3 are keys KEK5 through KEK8 corresponding to ID address bits equal to one.

More generally, when multi-bit symbols are used, each of these symbols can take any of V possible values. Hence, each entry 400 is uniquely identified by a symbol-value pair designating a rule as to how to extract the symbol from the ID and the value of that symbol, totaling to V·W KEKs. In a typical application, the participant's address is much longer and not only single bits may be used to differentiate between the keys, but any number of bits may be used (e.g., groups of three or four bits). For ease of understanding, the examples use symbols consisting of a single bit only.

Each participant 101 or receiver 111 is "aware of" or "knows" W of the keys from database 300 and uses these keys to encrypt and/or decrypt messages. By "aware of" and "knows" as used herein it is meant that the software implementing the key manager 109 and 119 includes variable declarations to construct variables that hold the specified information. The selection of which W keys are known to a particular participant 101 is conveniently based on the bit pattern in that particular participant's ID. For example, a participant 101 with a decimal participant ID="10" (i.e., a binary bit pattern of <1010>) knows the TEK, and KEK1, KEK6, KEK3, and KEK8. In this manner, as each participant 101 holds a unique ID it also holds a unique combination of the keys.

Figure 4:
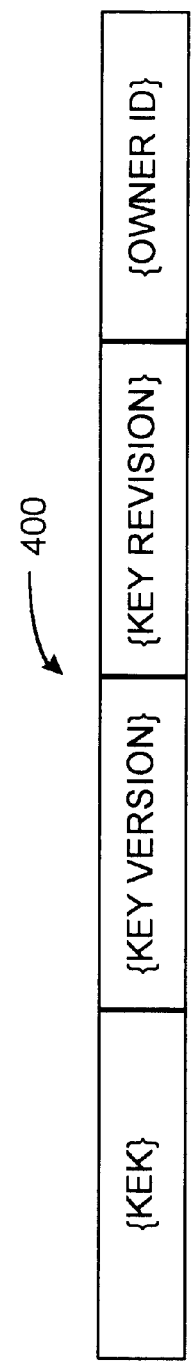
FIG. 4 shows an example entry from the database of FIG. 3 in greater detail.

FIG. 4 shows the contents of an entry 400 in database 300. In both the centralized flat and distributed flat implementations the keys (i.e., the TEK and KEKs) have associated version and revision numbers. Version and revision numbers are used in operation to maintain security relationships as described below. In the centralized flat implementation the version and revision number maintenance are performed by the centralized group key management component 120 and so this component is deemed to "own" the keys.

In the distributed flat implementation each entry 400 also includes an owner field that holds the participant ID of one participant 101 that is designated as a "key holder" for that key. The owner field is not required in the centralized flat implementation as the centralized sender entity is the owner of all the keys. In the distributed flat implementation no single participant 101 is able to be the key holder or owner of more than W of the KEKs. Hence, the key database in each participant 101 or receiver 111 comprises a flat data structure having W+1 entries 400. A significant difference between these alternative implementations is that in the distributed flat implementation some participants 101 may be designated as the owner of one or more of the W+1 keys whereas in the centralized flat implementation a centralized entity is the owner of the whole set of keys (i.e., V·W+1 keys), of which separate subsets comprising W+1 keys are known to each receiver 111.

Participants 101 that are distinguished as "key holders", perform some authoritative function. This function a) is only needed to improve performance on version changes, b) is assigned naturally to the creator of the newest version of the key, and c) can be taken over at any time by any other participant 101 that has received a key update message from the key holder, if that node should fail. In other words, no special trust is needed to transfer ownership of a key. The duties of a key holder are to generate a heartbeat message distributing the key and to perform key translations. These functions are described in greater detail below.

During join operations, revision numbers of the keys to be given to the new participant 101 or receiver 111 are increased by the active group key management components 108 or centralized group key manager 118. Revised keys are put through a one-way function implemented by group key management component 108 or 118 and participant key management components 109 or 119. This system-defined one-way function, which is known and identical among the group key manager 108 (or key manager 118) and each participant key manager component 109 (or 119), causes new keying material to be generated, without the need for communicating the new keying material itself. All that needs to be communicated is the increased revision number. The transmission of the revision number of the KEKs can be postponed until the updated keys are actually used. This occurs during a leave operation (described below). An example one-way function is the MD5 algorithm, the secure hash algorithm (SHA) or an equivalent.

During leave operations, every key known to the leaving participant 101 or receiver 111 is changed, including the TEK itself. The changed keys need to be communicated from the active group managers 108 (or group manager 118) to each of the participants 101 (or receivers 111) that know one of the changed keys. Also, the version numbers of those keys are increased. By periodically changing keying material and changing of revision numbers even in the absence of joins and leaves the window of opportunity that an attacker has before perfect forward secrecy is in effect is narrowed.

In the centralized flat approach, a key control group is created when group key manager 118 allocates a group by generating TEK and Keg's to fill entries 400 in data structure 300. Group key manager 118 announces its public key parameters and access control contact address in a heartbeat message.

In the distributed flat implementation, key control group creation is accomplished on an ad hoc basis because there is no distinct group management component 108. The first participant 101 in the group observes traffic and will find that no "heartbeat" exists and start to create its own keys (i.e., the TEK and W of the 2W KEKs (or more generally V·W KEKs). Hence, the initial participant generates the keys it would have received from the group manager 118 in the centralized flat approach. The initial participant 101 starts a heartbeat announcing itself and the fact that it is key holder for the keys it just generated. Each participant 101 that is a key holder performs a regular heartbeat sending out a message containing its view of the newest keys. Optionally, the heartbeat includes a short history of previous keys, as an automatic retransmission in case some messages were lost. Each participant 101 that has recently has created a key, will consider itself a key holder of the created key so long as it holds the newest version of that key. When a participant received a heartbeat superseding it own (i.e. a heartbeat including a newer version of a key of which it considers itself a key holder), that participant will cease to consider itself a key holder of that key. Over time the distributed flat implementation reaches a stable state in which heartbeat messages produced by different key holders are equal. This results in a small number of messages being sent out in a regular fashion, in addition to the reeking messages. The newcomer also has to verify that the admitting node is trustworthy, if it does not want to risk a "man-in-the-middle" (or other impostor) attack.

The heartbeat contains for each key the key's ID (e.g., a bit-value pair describing the key's location in database 300), version information, and revision information. In the distributed flat implementation the heartbeat message also includes the owner ID for each key. In early phases of group construction in the distributed flat implementation no previous common key exists, multiple creations of the same key are resolved as described below with respect to leave operations, except that a unicast connection is opened between the key holders to establish a previous key.

Any new participant 101 or receiver 111 intending to join the multicast group listens for the heartbeat message produced by the initial participant 101 (distributed flat) or the sender's group key control component 118 (centralized flat). A new receiver 111 receives the address of the multicast group via a session directory and gets the heartbeat message broadcast by group key manager 118. The new receiver 111 establishes a private and authenticated connection with admission control component 120 and, if successful, receives a set of KEKs associated with its network address and the TEK encrypted using the KEKs. The TEK is decrypted and the new receiver 111 can begin to decrypt traffic using the received keys and the connection with admission control component 120 is closed.

In the distributed flat implementation, new participants 101 will find one or more heartbeat messages. In a stable state there may be up to 2W (or more generally VW) different sources for the heartbeat messages in the distributed flat implementation as multiple prior participants may be acting as key holders. Before reaching the stable state, there may be more than 2W (or more generally VW) heartbeat sources. The prospective new participant is only interested in at most W of the heartbeat messages and collects a table of owners of keys which he needs, and which are owned by different participants. All those key bits that a new participant 101 needs but which have not been assigned are created by the joining participant.

The joining participant then contacts one or several (a small number) of current participants 101 and asks for admission to the group, at the same time publishing its public key parameters, credentials etc. Any participant sharing bits in the network address with the newcomer can choose to do an admission check, and if successful, may provide the newcomer with the current TEK and the KEKs that they share. Participants failing the admission check are desirably notified so they can take appropriate action. The keys are sent encrypted using the keying information provided. For any key bits that the new participant cannot acquire this way, he creates a unicast connection to the authoritative source of a key for a bit (the owner or key holder) and asks that participant 101 for admission and appropriate keying material.

The prior participants 101 that provide keys to the joining participant in the distributed flat implementation increase the revision number of the keys they provide and announce this change to the group in a key control message via key control group 107 (shown in FIG. 1*a*). The participant key manager 109 can begin to process traffic from the exiting participants using the received keys. Once the connection is set up, the unicast connection(s) is/are closed.

It is contemplated that the system may be implemented such that only prior participants that are acting as key holders answer queries from new participants 101 to reduce key synchronization problems. During a join the joining participant will first multicast a message on the "owners multicast group" without increasing rings. If no answer is received, the participant starts to grow a ring on the "participant multicast group". Alternatively, the joining participant may wait passively for a heartbeat which will contain the necessary information or listen for any senders with a partial network ID match and contact them for admission information. This would be followed by a possible selection or election of an owner, adding an automatic liveliness test.

If the newcomer had to create some keys of its own, because it uses symbol-value pairs that are not yet used within this group, it becomes a key holder for these new keys and so starts to heartbeat his key table. The participant's key table is a subset of key table 300 (shown in FIG. 3) having at most W+1 of the (2·W)+1 keys (or more generally, (V·W)+1) keys. Each entry 400 in the participant's key table includes owner's addresses and version/revision numbers of keys. If the other key owners admit the new participant 101, they will adapt their own key tables to show the new participant as owner of the newly assigned key bits. In this manner, all group participants 101 will eventually learn about the new ownership.

Because participant 101 includes admission control component 110 in the distributed flat embodiment, each may elect to perform local admission control, and ignore ownership of unadmitted peers. Each new participant 101 also can use its own admission control component 120 to admit the current participants. This action avoids the possibility of fooling the newcoming participant by a man-in-the-middle style attack.

In the distributed implementation, the TEK is owned by the first group member (i.e., the participant that generated the TEK) unless ownership is transferred to a successor. If a key holder should stop announcing its function, any other participant 101 knowing that key can take over. Ownership transfer occurs automatically when the current TEK owner leaves the group, is forced from the group, becomes unreachable, or otherwise fails to broadcast its heartbeat message. After a system-specified time without receiving the heartbeat one or more of the participants 101 will claim to be the new owner. If there are multiple claimants (i.e., participants 101 that are willing to take over) a non-flooding election scheme should be used to decide which participant becomes the new owner. For example, the participant 101 with higher priority (e.g. higher network address) wins. Any criteria can be use to select the new owner, however, by basing the selection criteria on the participants IP address, network ID, or participant ID the selection can occur with minimal communication between the participants. Additionally, the replacement key holder might want to perform a leave operation, discussed below, for the old key holder.

The new owner starts its own heartbeat, and acquires ownership of the TEK. If the missing participant 101 comes back later, and resumes its heartbeat, the one with the lower address will again win. Although this process is described in terms of transferring ownership of the TEK, a similar procedure is used for transferring ownership of any KEK also. In the case of KEK transfers, however, the new owner must be a participant 101 that knows the KEK that is being transferred.

Normal data transfer in accordance with the present invention is sent in packets 800 having a format such as shown in FIG. 8. Each packet 800 includes an association ID field which gives the ID of the participant 101 originating the data packet 800. Each packet 800 also includes a key version field and a key revision field. The KEK revision number may be a single bit which is set (i.e., placed in a one level) by join operations and reset after a leave operation has caused this key to be replaced with a new version. Additional headers which may comprise one or more header fields used in the traffic distribution component are also provided. The encrypted payload typically comprises an encrypted IP packet (e.g., a SKIP packet). As each packet is received by a receiving participant 101, the participants 101 can detect key revision changes and use the one-way function to generate the same revised key. Each packet may also indicate version changes which involve new keys, but the new key is provided in a separate update or reeking message described hereinbelow. The participant 101 can also request a message be resent if a version update was missed due to damaged or dropped packets which are typical in an Internet application.

Traffic encryption/decryption is accomplished in the participants 101 by the traffic encryption component 203. Participants 101 detect an increase in the key revision number and put the revised key through the one-way function to generate the new key and start encrypting/decrypting data with the new key. Participants 101 put their stored traffic encryption key through the one-way function. This generates the new TEK' (where the prime designation indicates a new version) in each participant's database. Once the new key update occurs, normal operation continues. In this manner, participants 101 need only communicate that a key has been revised in order for all participants 101 to update their keys to the new key. It is desirable that participants 101 keep previous (i.e., outdated) keys for a short, system defined time (e.g., one to three minutes) to handle cases where the sending participant 101 has not yet received the version update message.

During a leave operation the access control component 110 in one or more participants 101 informs the group key management components in the other participants 101 that one or more participants 101 are leaving the group so that they are no longer authorized to receive group multicast messages. The access control component 110 may initiate or throw out these participants 101 or simply may have detected that the participants themselves have left.

If one participant 101 (an "excluder") decides to throw out another participant 101, the excluder chooses a new TEK', and encrypts it with every KEK encryption key that it knows it does not share with the participant 101 that is to be thrown out. The KEKs that are known to the leaving participant are thrown out, leaving a set of remaining KEKs that are known only to remaining participants 101. The excluder assigns new KEKs for each KEK in the set of remaining KEKs which are encrypted using the corresponding old KEK and the new TEK. The excluder then becomes the key owner for the newly assigned KEKs. The excluder participant populates a table with this information and sends it to the group. Alternatively, the function of assigning new KEKs can be left to another key owner entity. Every participant that is able to understand the new TEK decrypts it, begins to use it, supplements the table with new KEKs which it holds, but which are not yet present in the table, and rebroadcasts the table.

If two participants 101 try to assign a new KEK to one slot at the same time (both using the same new incremented version number), the two KEKs are combined into one by the merging schemes discussed in greater detail below in reference to FIG. 5 through FIG. 6 illustrate this feature of the present invention in greater detail. Table 1 shows an example table prepared by an excluder participant with ID=9 (binary 1001) wants to throw out a participant with ID=10 (binary 1010):

TABLE 1

| Unusable/Unknown | new TEK encrypted in old KEK5 | ID address bit 0 |
| new TEK encrypted in old KEK2 | Unusable/Unknown | ID address bit 1 |
| Unusable | Unknown | ID address bit 2 |
| Unknown | Unusable | ID address bit 3 |

Where the slots marked "Unusable" are known by participant 101 with ID=10 therefore the KEKs stored in these slots may not be used to encrypt the new TEK (indicated as TEK'), and need to be replaced. The slots marked "Unknown" are not known by participant 101 with ID=9. Slots that are neither unusable nor unknown can be used to convey the new TEK' encrypted with the slot's old KEK. Those slots that are only marked unusable will be filled with new keg's, encrypted in the new TEK' and the old KEK. The table sent out by the excluder participant looks like:

TABLE 2

| Unusable/Unknown | new TEK in KEK5 | ID address bit 0 |
| New TEK encrypted in old KEK2 | Unusable/Unknown | ID address bit 1 |
| New KEK3 encrypted in old KEK3/TEK' | Unknown | ID address bit 2 |
| Unknown | New KEK8 encrypted in old KEK8/TEK' | ID address bit 3 |

The participants 101 with ID="xx10" where "x" represents an unspecified value (i.e., participants 2,6,10,14) cannot understand this message, and need to wait for a fuller table, or have to contact one of the other participants 101 directly if they do not get the update message in time (e.g. the sender of this message, owner of a key bit or a recent contributor to traffic in the group). The participant 101 with ID=10 will never be able to understand the message, and assuming consistent admission control mechanisms, he will also not be able to acquire the new TEK from other participants 101. He will stay excluded, which is the goal of the leave process.

It is best that changes to the admission control should be synchronized with the key update message. Otherwise, an excluded participant 101 could try to come back in to the multicast group until the admission control component is updated. It is possible to do this in conjunction with the key change, such that no exploitable inconsistencies exist. Also everyone joining later needs an up-to-date blacklist indicating excluded participants (or a whitelist indicated currently included participants).

As an example, participant 101 with ID=1 (i.e., binary 0001) receives the message in table 2 and completes it as far as possible to generate Table 3 shown below, before sending it out again.

TABLE 3

| Unusable/Unknown | new TEK in KEK5 | ID address bit 0 |
| New TEK encrypted in old KEK2 | Unusable/Unknown | ID address bit 1 |
| New KEK3 encrypted in old KEK3/TEK' | Unknown | ID address bit 2 |
| New TEK encrypted in KEK4 | New KEK8 encrypted in old KEK8/TEK' | ID address bit 3 |

Next, a participant 101 with ID=6 can fill in its solutions. If participant ID=2 would at the same time assign a new KEK1 and KEK6, the new KEK6 of participant ID=2 would win, because 2 is the lower network address. The resulting table 4 is complete.

TABLE 4

| New KEK1 encrypted in Old KEK1/TEK' | new TEK in KEK5 | ID address bit 0 |
| New TEK encrypted in old KEK2 | New KEK6 encryped in Old KEK6/TEK' | ID address bit 1 |
| New KEK3 encrypted in old KEK3/TEK' | New KEK7 encrypted in Old KEK7/TEK' | ID address bit 2 |
| New TEK encrypted in KEK4 | New KEK8 encrypted in old KEK8/TEK' | ID address bit 3 |

If two participants generate common and separate KEKs at the same time (e.g. participant ID=2 generates KEK1, KEK6 and KEK3, and participant ID=14 generates KEK1, KEK6 and KEK8) others would use the keys provided by the lower network address separately considered for each key (i.e., selected on a key-by-key basis). In the particular example this would result in KEK1, KEK6 and KEK3 from participant 2, and KEK8 from participant 14.

Participants 101 that after a specified time still do not find a TEK' encrypted in a KEK they can read, establish a secured unicast to one of the participants, acquire the TEK', expand the table and then broadcast the expanded table. This takes care of the situation where two distinct groups of participants 101 cannot communicate over multicast because they do not share any key encryption keys that they do not also share with the participant that is to be thrown out.

Groups are destroyed when all of the participants cease to exists in which case all secrets (the TEK and all KEKs) are discarded by each participants 101.

It is useful to understand a number of concepts which help to explain how the system in accordance with the present invention works with no centralized control with a number of participants 101 performing operations at the same time. These concepts are taken up in turn below:

Key Merging Since multiple participants may create new keys at the same time, each has to include its own creator ID to assure uniqueness. Additionally, each key holder has to include information indicating upon which key (version, revision, version creator) the new key is based, since this also is the key it is encrypted with. This allows the participants to implicitly (i.e. without sending additional messages) agree on a common key and also be able to understand any traffic that was encrypted using both the individual and the merged keys. Three typical merge scenarios are shown in FIG. 5–FIG. 7 and discussed below. In FIG. 5 through FIG. 7 the key message is indicated in parentheses by components (version#, revision#, version creator ID).

A first case in which multiple new revisions are received by a participant is shown in FIG. 5 where key holder 501 generates a key with a revision increase to participant 502 and 503. Participant 504 receives the key revision message from both participant 502 and participant 503 and can readily determine that there is no conflict since the key is the same in each message. In this case, no action is needed to get the new key because a revision increase is well-specified (i.e., non-ambiguous) and repeatable.

A second case in which multiple new versions are received by a participant is shown in FIG. 6. In this case, key holder 602 and key holder 603 have created version increases of the key from key holder 601. Participant 604 can see that the same version has been created by several key holders, and can combine these keys into a single new key which can be readily calculated from the base keys (e.g. using exclusive-or). The merged key's version creator ID will be the set of ID-tuples. Any key holder of a base key should consider itself as a key holder of the merged key in the first step until it is superseded (as described hereinbelow).

In a third case shown in FIG. 7, a new versions is created by key holder 702 while keyholder 703 generates a new revision. Any participant 704 seeing a revision increase on a key that has been superseded by a version increase, should increase the revision of the new merged key accordingly to assure perfect forward secrecy. The key holder for the new key may re-encrypt the new key with the new revision of its base key, to simplify operation for the newcomer that caused the revision increase.

A key holder stops performing a heart-beat, if its message is superseded. A message with key K is to be considered superseded, if any of the following keys are being announced: (a) a new revision, (b) a new version, which bases on K or any key superseding it, (c) a merged key which includes K, or (d) K is a merged key and it is being announced by a contributor to that key which has higher priority (e.g. higher network address).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. Specifically, it is contemplated that forty-eight symbols with each symbol comprising a two bit value could be used that directly map to an IP address and port number of an application thereby uniquely identifying the application in the network. In this case, the second part of the table (e.g., 64 symbols with 16 values each) encode keys that can be used to counter colluding participants. Normal join and leave operations can be performed on the 48 symbols which have high connectivity in the participant network, and whenever colluding enemies need to be thrown out, the other 64 symbols are available to be used. Colluding enemies would then have to be in the number of at least $2^w$ (e.g. $2^{16}$ in the specific example) to blank out all participants. One can combine different tables with different symbol spaces to achieve a number of properties of the resulting distributed system. These and similar modifications are readily implemented in accordance with the basic teachings of the present invention and are considered equivalents.

We claim:

1. A system for secure multicast comprising:
   a number (N) of participant entities each of which run on a participant computer system, the participant entities having a multicast application running thereon;
   a traffic distribution component coupled to each of the participant entities, the traffic distribution component supporting multiple receiver communication;
   a participant key management component within each participant entity, the participant key management component holding a first key that is shared with all of the number (N) of participant entities, and a set of second keys each of which is shared with a subset of the participating entities; and
   a group key management component having a flat key storage data structure storing the first key and the second keys, wherein each second key is stored in an entry in the data structure that is uniquely associated with a subset of the participants.

2. The system of claim 1 wherein the group key management component is implemented in a plurality of the participants and the group key management components of the plurality of participants cooperatively define the flat key storage data structure as a distributed data structure storing second keys of all the participants.

3. The system of claim 2 wherein the group key management component is implemented in a centralized fashion and associated with only one participant.

4. The system of claim 2 wherein the second keys are associated with an ID identifying one of the participants that owns that second key.

5. The system of claim 2 wherein the first key is associated with an ID identifying one of the participants that owns the first key.

6. The system of claim 1 wherein the first key is marked with a revision tag and the system further comprises:
   a one-way function generator operating in the group key management component and each participant key management component, wherein each one-way function generator accept the first key as input and implements the same one-way function on the first key to generate a new revision of the first key.

7. The system of claim 1 wherein each second key is marked with a revision tag and the system further comprises:
   a one-way function generator operating in the group key management component and each participant key management component, wherein each one-way function generator accept each second key as input and implements the same one-way function on the second key to generate a new revision of the first key.

8. The system of claim 1 further comprising:
   a random key generator in the group key management component of at least one participant associated with the group key management component, wherein the group key management component assigns the first and second keys as needed and designates the participant assigning a specific key as a keyholder for the assigned key.

9. The system of claim 8 further comprising:
   a heartbeat message generator within each keyholder generating a heartbeat message; and
   an admission control component in each keyholder coupled to the traffic distribution component and responsive to receive responses to the heartbeat message to selectively admit participants.

10. The system of claim 1 wherein each participant is identified by a W-symbol wide ID wherein each symbol can take on a number (V) of values, wherein the value V may be different for each for the W symbols and each participant holds W second keys.

11. The system of claim 10 wherein V·W second keys are distributed among all of the participant entities in the entire system.

12. The system of claim 1 wherein each participant is identified by a W-symbol wide ID wherein each symbol can take on a number (V) values and each key data structure comprises a (V·W)-entry database.

13. The system of claim 1 wherein each of the participants lacks knowledge of the identity of at least some of the other participants.

14. A secure multicast participant system running on a computer system that is coupled to a multicast enabled traffic distribution network, the secure multicast participant system comprising:
   a traffic distribution component coupled to interface with the network;
   an admission control component coupled to receive and send messages on the traffic distribution component;
   a heartbeat message detector in the admission control component for detecting a heartbeat message identifying an address of a key owner and keys owned by that key owner;
   a group key management component comprising a flat database having a plurality of entries, wherein each entry includes a key field holding a key value and an associated owner field holding an ID of an owner of the key;
   a first key stored in an entry of the database wherein the first key is shared with a group of external participants and
   a set of second keys each of which is shared with a subgroup of the group of external participants;
   a traffic encryption/decryption component coupled to receive encrypted data packets from the traffic distribution component and decrypt the received data packets using the first and second keys;
   a transport component coupled to the traffic encryption/decryption component to receive the decrypted data packets and generate application data; and
   a receiver multicast application coupled to the transport component to receive the application data and provide receiver-side multicast services using the received application data.

15. A secure multicast group comprising:
   a group of participants each having a unique network ID wherein at least one of the participants acts as a sender and at least one of the participants acts as a receiver;
   a participant key manager in each of the participants having a data structure holding a first key that is shared with all of the participants and a set of second keys;
   a group key manager having a data structure holding the first key and all of the second keys, wherein none of the data structures include data representing the unique network ID of all of the participants.

16. The secure multicast group of claim 15 wherein the network ID of each participant is used to select the set of second keys held by that participant.

17. The secure multicast group of claim 16 wherein the network ID of each participant is determined from an IP address of the participant.

18. A method for conducting secure multicast communication over an unsecure communication network with a group of participants, the method comprising the computer implemented steps of:
   creating a data structure within each participant, the data structure having a transmission encryption key (TEK) entry for storing a TEK and a set of entries for storing a set of key encryption keys (KEKs);
   causing one of the participants to generate the TEK and designating that participant as a TEK key holder;
   causing at least one of the participants to generate the KEKs and designating each participant that generates a KEK as the keyholder for the KEK that was generated;
   distributing a set of KEKs from each KEK keyholder to each of the participants such that each participant can only receive a unique set of KEKs;
   storing the unique set of KEKs in the set of entries of the data structure within each participant;
   for each participant, encrypting the TEK using the unique set of KEKs distributed to that participant;
   distributing the encrypted TEKs from the TEK keyholder to all of the participants;
   in each participant, decrypting one of the encrypted TEKs using the unique set of KEKs stored in the participant's data structure;
   storing the decrypted TEK in the TEK entry of each participant;
   generating a message within one of the participants;
   encrypting the message using the TEK held by the participant generating the message;
   distributing the message to all of the participants; and
   decrypting the message in each of the participants that hold a TEK matching the TEK of the participant generating the message.

19. A computer program product comprising:
   a computer usable medium having computer readable code embodied therein for conducting secure multicast communication over an unsecure communication network with a group of participants operating on participant computer systems, the computer program product comprising:
   computer program devices operating in the participant computer systems and configured to cause the participant computer to creating a data having a transmission encryption key (TEK) entry for storing a TEK and a set of entries for storing a set of key encryption keys (KEKs);
   computer program devices configured to cause the at least one participant computer system to generate the TEK and designating that participant as a TEK keyholder;
   computer program devices configured to cause the at least one of the participant to generate the KEKs and designating each participant that generates a KEK as the keyholder for the KEK that was generated;
   computer program devices configured to cause the participant computer system to distribute a set of KEKs from each KEK keyholder to each of the participants such that each participant can only receive a unique set of KEKs;
   computer program devices configured to cause the participant computer system to store the unique set of KEKs in the set of entries of the data structure within each participant;
   computer program devices operating in each participant computer system configured to cause the participant computer system to encrypt the TEK using the unique set of KEKs distributed to that participant;
   computer program devices configured to cause the TEK keyholder to distribute the encrypted TEKs to all of the participants;
   computer program devices configured to cause each participant computer system to decrypt one of the encrypted TEKs using the unique set of KEKs stored in the participant's data structure;
   computer program devices configured to cause the participant computer system to store the decrypted TEK in the TEK entry;

computer program devices configured to cause the participant computer system to generate a message within one of the participants;

computer program devices configured to cause the participant computer system to encrypt the message using the TEK held by the participant generating the message;

computer program devices configured to cause the participant computer system to distribute the message to all of the participants; and computer program devices configured to cause the participant computer system to decrypt the message in each of the participants that hold a TEK matching the TEK of the participant generating the message.

20. A computer data signal embodied in a carrier wave for conducting secure multicast communication over an unsecure communication network with a group of participants operating on participant computer systems, the computer data signal comprising:

a first code portion comprising code configured to cause the participant computer to creating a data having a transmission encryption key (TEK) entry for storing a TEK and a set of entries for storing a set of key encryption keys (KEKs);

a second code portion comprising code configured to cause the at least one participant computer system to generate the TEK and designating that participant as a TEK keyholder;

a third code portion comprising code configured to cause the at least one of the participant to generate the KEKs and designating each participant that generates a KEK as the keyholder for the KEK that was generated;

a fourth code portion comprising code configured to cause the participant computer system to distribute a set of KEKs from each KEK keyholder to each of the participants such that each participant can only receive a unique set of KEKs;

a fifth code portion comprising code configured to cause the participant computer system to store the unique set of KEKs in the set of entries of the data structure within each participant;

a sixth code portion comprising code configured to cause the participant computer system to encrypt the TEK using the unique set of KEKs distributed to that participant;

a seventh code portion comprising code configured to cause the TEK keyholder to distribute the encrypted TEKs to all of the participants;

a eighth code portion comprising code configured to cause each participant computer system to decrypt one of the encrypted TEKs using the unique set of KEKs stored in the participant's data structure;

a ninth code portion comprising code configured to cause the participant computer system to store the decrypted TEK in the TEK entry;

a tenth code portion comprising code configured to cause the participant computer system to generate a message within one of the participants;

a eleventh code portion comprising code configured to cause the participant computer system to encrypt the message using the TEK held by the participant generating the message;

a twelfth code portion comprising code configured to cause the participant computer system to distribute the message to all of the participants; and a thirteenth code portion comprising code configured to cause the participant computer system to decrypt the message in each of the participants that hold a TEK matching the TEK of the participant generating the message.

21. A method for managing encryption keys in a secure multicast group having a plurality of participants, the method comprising the steps of:

creating a first encryption key in a first one of the participants, the first encryption key being associated with a unique subgroup of the participants;

independently creating a second encryption key in another of the participants, the second encryption key being associated with the same unique subgroup of the participants as was the first encryption key; and combining the first and second keys to generate a single third encryption key wherein the third encryption key is associated with the same unique subgroup of the participants and supersedes the first and second encryption keys.

22. The method of claim 21 wherein the step of combining is initiated and completed with only unidirectional communication between the participants.

* * * * *